Sept. 19, 1944.  G. H. ACKER  2,358,612
MAGNETIC DRAIN PLUG
Filed March 24, 1942
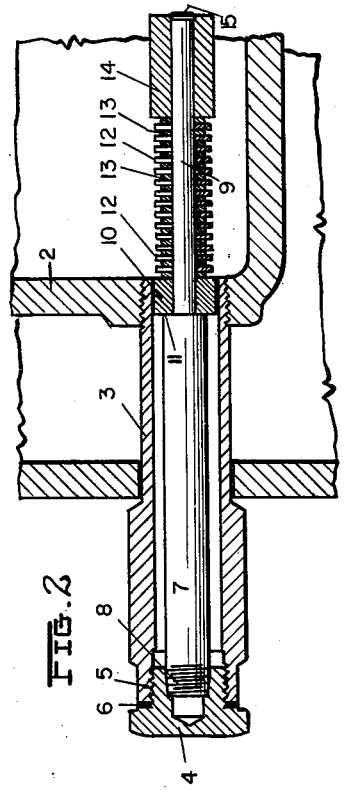
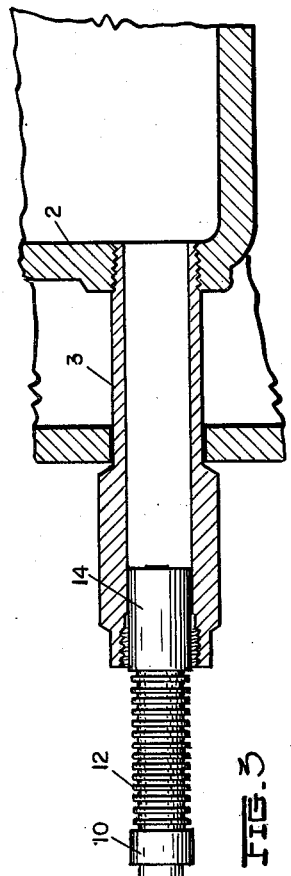
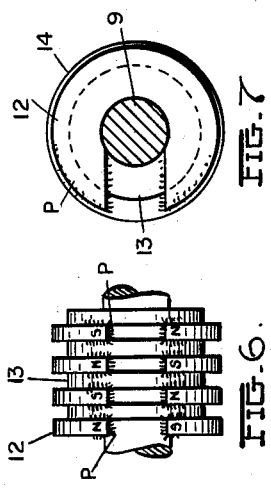
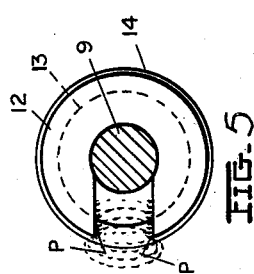
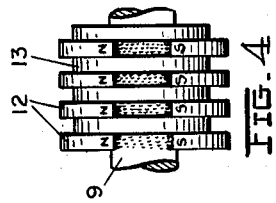
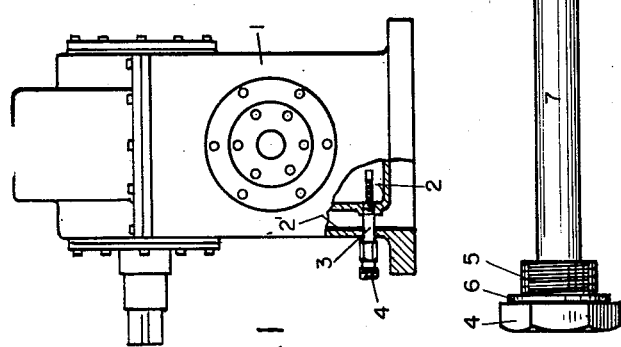
INVENTOR.
GEORGE H. ACKER
BY Oberlin, Limbach & Day
ATTORNEYS Patented Sept. 19, 1944

2,358,612

UNITED STATES PATENT OFFICE 2,358,612

MAGNETIC DRAIN PLUG

George H. Acker, Shaker Heights, Ohio, assignor to The Cleveland Worm & Gear Company, Cleveland, Ohio, a corporation of Ohio Application March 24, 1942, Serial No. 435,980

9 Claims. (Cl. 184—6)

The present invention relates to a closure device or plug adapted to close the drain opening in a lubricant reservoir, and having permanent magnetic elements embodied therein which are capable of extracting and segregating ferrous metal particles from the lubricant body. Ferrous metal particles, such as minute pieces of iron and steel, become entrained in a lubricant reservoir of a power mechanism, such as in the crank case of an internal combustion engine or in the housing of a gear unit, and such particles act as an abrasive within the body of the lubricant tending to produce a deteriorating and hazardous wear on the moving parts. It is therefore highly desirable to remove these particles as rapidly as they become entrained in the oil or lubricant body, not only to eliminate such abrasive action, but also to increase the efficient life of the lubricant.

Magnetic drain plugs have heretofore been known and used in the art. However their capacity to segregate and retain a quantity of ferrous particles has been inherently limited due to the structures employed, resulting in the necessity for frequent removal of the plugs from the lubricant reservoir and cleaning of the accumulated particles therefrom. During such removal and re-insertion of the magnetic drain plugs heretofore used, the opportunity and likelihood of the magnetic portion thereof coming into contact with the steel or iron reservoir wall, is quite pronounced. Such contact of the magnetic portion of the drain plug with the reservoir housing is disadvantageous in that it will, in turn, cause a magnetization which will also attract ferrous particles and retain them within the reservoir housing where they cannot be reached for removal except by a complete draining of the lubricant body and disassembly of the power mechanism in order to gain access to the interior of the lubricant reservoir.

It is, therefore, the general object and nature of my invention to provide a new and improved magnetic drain plug structure having first, the property of a maximum ferrous particle retention for the permissible and available dimensions of the drain plug, and secondly, the provision of means on the plug for preventing contact of its magnetic portion with any part of the lubricant reservoir housing during insertion and removal of the plug.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is an elevational view with a portion broken away, showing the magnetic drain plug embodying the principle of my invention as applied to a power mechanism, namely, a worm gear reduction unit;

Fig. 2 is a detailed sectional view of the magnetic drain plug in its normally assembled position;

Fig. 3 is a view similar to Fig. 2 but showing the magnetic drain plug in its withdrawn position for the purpose of cleaning;

Fig. 4 is an enlarged detailed view of the magnetic elements on the stem of the drain plug;

Fig. 5 is a view taken upon a plane normal to Fig. 4;

Fig. 6 is a view similar to that of Fig. 4 but illustrating an alternative arrangement of the individual permanent magnets; and Fig. 7 is a view taken on a plane normal to that of Fig. 6.

Now referring more particularly to the drawing, in Fig. 1 there is shown a worm wear reduction unit, such as the one covered by my prior U. S. Patent No. 2,113,868, indicated generally at 1, which has an interior oil or lubricant reservoir 2 and a drain outlet fitting or tube 3 extending through the wall thereof and out through the outer housing wall 2' to the exterior of the unit 1.

The outer end of the tube 3 is closed by a cup or plug 4 threadably engaged therein as indicated at 5 and sealed by the gasket or washer 6. A cylindrical rod or stem 7 is attached to the plug 4 such as by the interior threaded connection indicated at 8. The stem 7 projects through the tube 3 and into the interior of the lubricant reservoir formed by the housing 2. That portion of the stem 7 which projects into the interior of the lubricant reservoir is in the form of a reduced diameter portion 9.

A cylindrical portion or sleeve 10 fits over the reduced portion 9 of the stem 7 and abuts against the shoulder 11 formed by the juncture of the two plug stem portions.

A series of permanent magnets 12 which are of C-shaped form, having their poles located at the terminal ends of the C, are mounted upon the reduced stem portion 9 and separated from each other by the spacer rings or washers 13. The stem portions 7 and 9 and the washers 13 are suitably composed of a paramagnetic or non-magnetic metal such as brass or copper.

A second cylindrical sleeve 14 is located on the outer end of the stem portion 9 and held thereon such as by the upset or riveted end 15.

The outer diameter of the cylindrical sleeves 10 and 14 is substantially equal to the inner diameter of the tube 3 so as to make a sliding, but not a binding, fit within the latter. It will be noted that the diameter of the sleeves 10 and 14 is slightly greater than the outer diameter of the C-shaped permanent magnets 12. The sleeves 10 and 14 are also composed of a non-magnetic material such as copper or brass.

As shown in Figs. 4 and 5, the C-shaped magnets are so arranged as to have their terminal ends or caps in longitudinal alignment, and with their like poles on the same side of the plug stem 9. In other words, all of the "North" poles are on the same side and in longitudinal alignment, and so also, all of the "South" poles. As shown by the dotted lines in Figs. 4 and 5, the fields of maximum magnetic flux intensity thus occur between the opposite poles of each individual magnet 12. Now, ferrous metallic particles, such as iron and steel filings, and similar minute pieces, will be found to attach themselves only to the edges, rather than the surfaces of those portions of the permanent magnets which are in the field of maximum flux intensity. For the sake of illustration, these particles, denoted by the reference letter P, have been shown in slightly exaggerated form in Fig. 5.

In Figs. 6 and 7, the magnets 12 are shown in an alternative arrangement wherein the unlike or "North" and "South" poles of adjacent magnets are in longitudinal alignment. In this latter arrangement, the fields of magnetic flux are set up not only between the "North" and "South" poles of individual magnets 12 but also between the "North" and "South" poles of adjacent magnets. As illustrated by the lines and dots P in Figs. 6 and 7, this latter arrangement renders available additional edges of the magnetic elements for picking up particles of iron and steel.

It will thus be seen that my above described construction provides a maximum amount of particle retaining edges in the relatively limited longitudinal extent and diameter of the drain plug structure. Furthermore, as illustrated in Fig. 3, the drain plug may be withdrawn to the position shown therein when it is desired to remove it from the interior of the lubricant reservoir for cleaning off and removing the collected metallic particles. In this instance, the sleeve portion 14 acts as a piston closing the interior of the fitting 3 and preventing the lubricant from draining out of the reservoir. Further, both the sleeves 10 and 14, by reason of the sliding fit within the interior of the tube 3, act as guides which prevent the plug stem 7 from being moved laterally, thus eliminating any likelihood of the permanent magnetic elements 12 coming in contact with the wall 2 or the tube 3.

Other modes of applying the principle of the invention may be employed, change being made as regards the details described, provided the features stated in any of the following claims or the equivalent of such be employed.

I therefore particularly point out and distinctly claim as my invention:

1. A magnetic drain plug for a lubricant reservoir, comprising a closure member for the reservoir drain opening, an elongated support member of non-magnetic material carried by said closure member and adapted to project into the interior of said reservoir, and a series of permanent magnets mounted transversely on said support member in longitudinally spaced relationship.

2. A magnetic drain plug for a lubricant reservoir, comprising a closure member for the reservoir drain opening, an elongated support member carried by said closure member and adapted to project into the interior of said reservoir, and a series of C-shaped permanent magnets surrounding said support member and mounted transversely thereon in parallel, longitudinally spaced relationship to each other.

3. A magnetic drain plug for a lubricant reservoir, comprising a closure member for the reservoir drain opening, an elongated support member of non-magnetic material carried by said closure member and adapted to project into the interior of said reservoir, a series of permanent magnets mounted transversely on said support member in longitudinally spaced relationship and spacing rings of non-magnetic material occupying the spaces between said magnets.

4. A magnetic drain plug for a lubricant reservoir, comprising a closure member for the reservoir drain opening, an elongated support member carried by said closure member and adapted to project into the interior of said reservoir, a series of C-shaped permanent magnets surrounding said support member and mounted transversely thereon in parallel, longtudinally spaced relationship to each other and spacing rings of non-magnetic material occupying the spaces between said magnets.

5. A magnetic drain plug for a lubricant reservoir, comprising a closure member for the reservoir drain opening, an elongated support member carried by said closure member and adapted to project into the interior of said reservoir, a series of C-shaped permanent magnets surrounding said support member and mounted transversely thereon in parallel, longitudinally spaced relationship to each other and cylindrical portions located on said support member at each end of said series of magnets, the diameter of said cylindrical portions being greater than the outer diameter of said magnets.

6. A magnetic drain plug for a lubricant reservoir, comprising a closure member for the reservoir drain opening, an elongated support member carried by said closure member and adapted to project into the interior of said reservoir, a series of C-shaped permanent magnets surrounding said support member and mounted transversely thereon in parallel, longitudinally spaced relationship to each other, spacing rings of non-magnetic material occupying the spaces between said magnets and cylindrical portions located on said support member at each end of said series of magnets, the diameter of said cylindrical portions being greater than the outer diameter of said magnets.

7. In a magnetic drain plug for a lubricant reservoir, the combination of a tube fitting in the reservoir drain opening, a plug for closing the end of said tube, a stem carried by said plug and projecting through said tube into the interior of said reservoir, permanent magnet means mounted on that portion of the stem normally disposed in said reservoir interior, and cylindrical portions of non-magnetic material on said stem at each end of said magnet means, said cylindrical portions being adapted to make a sliding fit in the interior of said tube.

8. In a magnetic drain plug for a lubricant reservoir, the combination of a tube fitting in the reservoir drain opening, a plug for closing the end of said tube, a stem carried by said plug and projecting through said tube into the interior of said reservoir, a series of C-shaped permanent magnets surrounding said stem and mounted thereon in longitudinally spaced, parallel relationship, said series of magnets being located on that portion of said stem normally disposed in said reservoir, and cylindrical portions of non-magnetic material on said stem at each end of said series of magnets, said cylindrical portions being adapted to make a sliding fit in the interior of said tube.

9. In a magnetic drain plug for a lubricant reservoir, the combination of a tube fitting in the reservoir drain opening, a plug for closing the end of said tube, a stem carried by said plug and projecting through said tube into the interior of said reservoir, a series of C-shaped permanent magnets surrounding said stem and mounted thereon in longitudinally spaced, parallel relationship, said series of magnets being located on that portion of said stem normally disposed in said reservoir, cylindrical portions of non-magnetic material on said stem at each end of said series of magnets, said cylindrical portions being adapted to make a sliding fit in the interior of said tube, and spacing rings of non-magnetic material occupying the spaces between said magnets.

GEORGE H. ACKER.